(12) United States Patent
Paysan et al.

(10) Patent No.: US 11,386,592 B2
(45) Date of Patent: Jul. 12, 2022

(54) TOMOGRAPHIC IMAGE ANALYSIS USING ARTIFICIAL INTELLIGENCE (AI) ENGINES

(71) Applicant: Varian Medical Systems International AG, Palo Alto, CA (US)

(72) Inventors: Pascal Paysan, Basel (CH); Benjamin M Haas, Roggwil (CH); Janne Nord, Espoo (FI); Sami Petri Perttu, Helsinki (FI); Dieter Seghers, Zurich (CH); Joakim Pyyry, Helsinki (FI)

(73) Assignee: VARIAN MEDICAL SYSTEMS INTERNATIONAL AG

( * ) Notice: Subject to any disclaimer, the term of this patent is extended or adjusted under 35 U.S.C. 154(b) by 268 days.

(21) Appl. No.: 16/722,017

(22) Filed: Dec. 20, 2019

(65) Prior Publication Data

US 2021/0192810 A1 Jun. 24, 2021

(51) Int. Cl.
*G06K 9/00* (2022.01)
*G06T 11/00* (2006.01)
*G06N 3/04* (2006.01)
*G06N 3/08* (2006.01)

(52) U.S. Cl.
CPC .......... *G06T 11/006* (2013.01); *G06N 3/0454* (2013.01); *G06N 3/08* (2013.01); *G06T 11/005* (2013.01); *G06T 2210/41* (2013.01)

(58) Field of Classification Search
CPC . G06T 11/006; G06T 11/005; G06T 2210/41; G06T 2207/10081; G06T 2207/20081; G06T 2207/20084; G06T 7/0012; G06T 11/008; G06N 3/0454; G06N 3/08; G06N 3/0445

USPC ........................................................ 382/131
See application file for complete search history.

(56) References Cited

U.S. PATENT DOCUMENTS

| | | |
|---|---|---|
| 2006/0237652 A1 | 10/2006 | Kimchy et al. |
| 2007/0036418 A1 | 2/2007 | Pan et al. |
| 2012/0063655 A1 | 3/2012 | Dean et al. |
| 2012/0230566 A1 | 9/2012 | Dean et al. |
| 2013/0303884 A1 | 11/2013 | Kuntz et al. |

(Continued)

OTHER PUBLICATIONS

Tobias Würfl et al., "Deep Learning Computed Tomography", Retrieved on Dec. 13, 2019 from <URL: https://www5.informatik.uni-erlangen.de/Forschung/Publikationen/2016/Wurfl16-DLC.pdf>, pp. 8, Andreas Maier Pattern Recognition Lab., Friedrich-Alexander-University Erlangen-Nuremberg, Germany.

(Continued)

*Primary Examiner* — Charlotte M Baker
(74) *Attorney, Agent, or Firm* — Su IP Consulting

(57) ABSTRACT

Example methods and systems for tomographic data analysis are provided. One example method may comprise: obtaining first three-dimensional (3D) feature volume data and processing the first 3D feature volume data using an AI engine that includes multiple first processing layers, an interposing forward-projection module and multiple second processing layers. Example processing using the AI engine may involve: generating second 3D feature volume data by processing the first 3D feature volume data using the multiple first processing layers, transforming the second 3D volume data into 2D feature data using the forward-projection module and generating analysis output data by processing the 2D feature data using the multiple second processing layers.

21 Claims, 10 Drawing Sheets

(56) References Cited

U.S. PATENT DOCUMENTS

| | | | |
|---|---|---|---|
| 2014/0003695 | A1 | 1/2014 | Dean et al. |
| 2016/0042537 | A1 | 2/2016 | Ng et al. |
| 2017/0071562 | A1 | 3/2017 | Suzuki |
| 2017/0238897 | A1* | 8/2017 | Siewerdsen ............ A61B 6/466 |
| 2018/0374245 | A1 | 12/2018 | Xu et al. |
| 2019/0139642 | A1 | 5/2019 | Roberge et al. |
| 2019/0206095 | A1 | 7/2019 | Xing et al. |
| 2019/0216409 | A1 | 7/2019 | Zhou et al. |
| 2019/0365341 | A1 | 12/2019 | Chan et al. |
| 2020/0211239 | A1 | 7/2020 | Ng et al. |
| 2021/0192809 | A1 | 6/2021 | Paysan et al. |

OTHER PUBLICATIONS

Masakazu Matsugu et al., "Subject Independent Facial Expression Recognition with Robust Face Detection Using a Convolutional Neural Network", Neural Networks, 2003, pp. 555-559, vol. 16, Elsevier Science.

Olaf Ronneberger et al., "U-Net: Convolutional Networks for Biomedical Image Segmentation", Computer Science Department and BIOSS Centre for Biological Signalling Studies, May 18, 2015, University of Freiburg, Germany.

Gernot Riegler et al., "OctNetFusion: Learning Depth Fusion from Data", Institute for Computer Graphics and Vision, Graz University of Technology, Retrieved on Dec. 13, 2019 from <URL: http://www.cvlibs.net/publications/Riegler2017THREEDV.pdf>, p. 10.

International Search Report and Written Opinion of the International Searching Authority, International application No. PCT/EP2020/085719, dated Feb. 19, 2021.

Wei-An Lin et al., "DuDoNet: Dual Domain Network for CT Metal Artifact Reduction", 2019 IEEE/CVF Conference on Computer Vision and Pattern Recognition (CVRR), 2019, p. 10504 ~ p. 10513, IEEE Computer Society.

Miriam Leeser et al., "Fast Reconstruction of 3D Volumes from 2D CT Projection Data with GPUs", BMC Research Notes 7: 582, 2014, Available at URL <https://doi.org/10.1186/1756-0500-7-582/>, pp. 3-5.

Taolin Jin et al., "Learning Deep Spatial Lung Features by 3D Convolutional Neural Network for Early Cancer Detection", 2017 International Conference on Digital Image Computing: Techniques and Applications (DICTA), Dec. 21, 2017, pp. 1-5.

Hongming Shan et al., "3-D Convolutional Encoder-Decoder Network for Low-Dose CT via Transfer Learning from a 2-D Trained Network", IEEE Transactions on Medical Imaging, Jun. 2018, vol. 37, No. 6, pp. 1522-1530.

* cited by examiner

US 11,386,592 B2

TOMOGRAPHIC IMAGE ANALYSIS USING ARTIFICIAL INTELLIGENCE (AI) ENGINES

CROSS-REFERENCE TO RELATED APPLICATION

The present application is related in subject matter to U.S. patent application Ser. No. 16/722,004.

BACKGROUND

Computerized tomography (CT) involves the imaging of the internal structure of a target object (e.g., patient) by collecting projection data in a single scan operation ("scan"). CT is widely used in the medical field to view the internal structure of selected portions of the human body. In an ideal imaging system, rays of radiation travel along respective straight-line transmission paths from the radiation source, through the target object, and then to respective pixel detectors of the imaging system to produce volume data (e.g., volumetric image) without artifacts. Besides artifact reduction, radiotherapy treatment planning (e.g., segmentation) may be performed based on the resulting volume data. However, in practice, reconstructed volume data may contain artifacts, which in turn cause image degradation and affect subsequent diagnosis and radiotherapy treatment planning.

SUMMARY

According to a first aspect of the present disclosure, example methods and systems for tomographic image reconstruction are provided. One example method may comprise: obtaining two-dimensional (2D) projection data and processing the 2D projection data using the AI engine that includes multiple first processing layers, an interposing back-projection module and multiple second processing layers. Example processing using the AI engine may involve: generating 2D feature data by processing the 2D projection data using the multiple first processing layers, reconstructing first three-dimensional (3D) feature volume data from the 2D feature data using the back-projection module generating second 3D feature volume data by processing the first 3D feature volume data using the multiple second processing layers. During a training phase, the multiple first processing layers and multiple second processing layers, with the back-projection module interposed in between, may be trained together to learn respective first weight data and second weight data.

According to a second aspect of the present disclosure, example methods and systems for tomographic image analysis are provided. One example method may comprise: obtaining first three-dimensional (3D) feature volume data and processing the first 3D feature volume data using an AI engine that includes multiple first processing layers, an interposing forward-projection module and multiple second processing layers. Example processing using the AI engine may involve: generating second 3D feature volume data by processing the first 3D feature volume data using the multiple first processing layers, transforming the second 3D volume data into 2D feature data using the forward-projection module and generating analysis output data by processing the 2D feature data using the multiple second processing layers. During a training phase, the multiple first processing layers and the multiple second processing layers, with the forward-projection module interposed in between, may be trained together to learn respective first weight data and second weight data.

DETAILED DESCRIPTION

Figure 1:
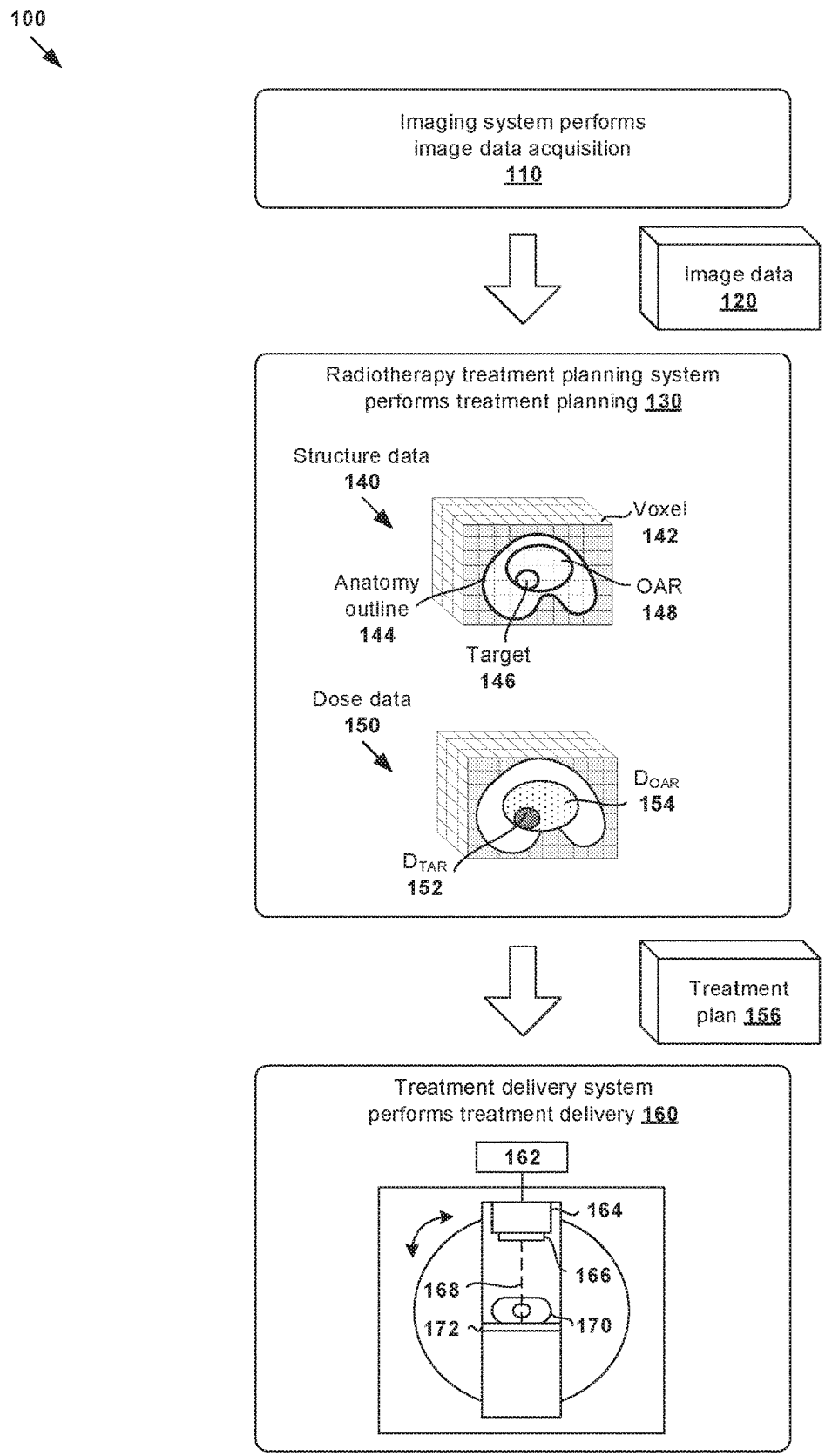
FIG. 1 is a schematic diagram illustrating an example process flow for radiotherapy treatment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a schematic diagram illustrating example process flow 110 for radiotherapy treatment. Example process 110 may include one or more operations, functions, or actions illustrated by one or more blocks. The various blocks may be combined into fewer blocks, divided into additional blocks, and/or eliminated based upon the desired implementation. In the example in FIG. 1, radiotherapy treatment generally includes various stages, such as an imaging system performing image data acquisition for a patient (see 110); a radiotherapy treatment planning system (see 130) generating a suitable treatment plan (see 156) for the patient; and a treatment delivery system (see 160) delivering treatment according to the treatment plan.

In more detail, at 110 in FIG. 1, image data acquisition may be performed using an imaging system to capture image data 120 associated with a patient (particularly the patient's anatomy). Any suitable medical image modality or modalities may be used, such as computed tomography (CT), cone beam computed tomography (CBCT), positron emission tomography (PET), magnetic resonance imaging (MRI), magnetic resonance tomography (MRT), single photon emission computed tomography (SPECT), any combination thereof, etc. For example, when CT or MRI is used, image data 120 may include a series of two-dimensional (2D) images or slices, each representing a cross-sectional view of the patient's anatomy, or may include volumetric or three-dimensional (3D) images of the patient, or may include a time series of 2D or 3D images of the patient (e.g., four-dimensional (4D) CT or 4D CBCT).

At 130 in FIG. 1, radiotherapy treatment planning may be performed during a planning phase to generate treatment plan 156 based on image data 120. Any suitable number of treatment planning tasks or steps may be performed, such as segmentation, dose prediction, projection data prediction, treatment plan generation, etc. For example, segmentation may be performed to generate structure data 140 identifying various segments or structures may from image data 120. In practice, a three-dimensional (3D) volume of the patient's anatomy may be reconstructed from image data 120. The 3D volume that will be subjected to radiation is known as a treatment or irradiated volume that may be divided into multiple smaller volume-pixels (voxels) 142. Each voxel 142 represents a 3D element associated with location (i, j, k) within the treatment volume. Structure data 140 may be include any suitable data relating to the contour, shape, size and location of patient's anatomy 144, target 146, organ-at-risk (OAR) 148, or any other structure of interest (e.g., tissue, bone). For example, using image segmentation, a line may be drawn around a section of an image and labelled as target 146 (e.g., tagged with label="prostate"). Everything inside the line would be deemed as target 146, while everything outside would not.

In another example, dose prediction may be performed to generate dose data 150 specifying radiation dose to be delivered to target 146 (denoted "$D_{TAR}$" at 152) and radiation dose for OAR 148 (denoted "$D_{OAR}$" at 154). In practice, target 146 may represent a malignant tumor (e.g., prostate tumor, etc.) requiring radiotherapy treatment, and OAR 148 a proximal healthy structure or non-target structure (e.g., rectum, bladder, etc.) that might be adversely affected by the treatment. Target 146 is also known as a planning target volume (PTV). Although an example is shown in FIG. 1, the treatment volume may include multiple targets 146 and OARs 148 with complex shapes and sizes. Further, although shown as having a regular shape (e.g., cube), voxel 142 may have any suitable shape (e.g., non-regular). Depending on the desired implementation, radiotherapy treatment planning at block 130 may be performed based on any additional and/or alternative data, such as prescription, disease staging, biologic or radiomic data, genetic data, assay data, biopsy data, past treatment or medical history, any combination thereof, etc.

Based on structure data 140 and dose data 150, treatment plan 156 may be generated include 2D fluence map data for a set of beam orientations or angles. Each fluence map specifies the intensity and shape (e.g., as determined by a multileaf collimator (MLC)) of a radiation beam emitted from a radiation source at a particular beam orientation and at a particular time. For example, in practice, intensity modulated radiotherapy treatment (IMRT) or any other treatment technique(s) may involve varying the shape and intensity of the radiation beam while at a constant gantry and couch angle. Alternatively or additionally, treatment plan 156 may include machine control point data (e.g., jaw and leaf positions), volumetric modulated arc therapy (VMAT) trajectory data for controlling a treatment delivery system, etc. In practice, block 130 may be performed based on goal doses prescribed by a clinician (e.g., oncologist, dosimetrist, planner, etc.), such as based on the clinician's experience, the type and extent of the tumor, patient geometry and condition, etc.

At 160 in FIG. 1, treatment delivery is performed during a treatment phase to deliver radiation to the patient according to treatment plan 156. For example, radiotherapy treatment delivery system 160 may include rotatable gantry 164 to which radiation source 166 is attached. During treatment delivery, gantry 164 is rotated around patient 170 supported on structure 172 (e.g., table) to emit radiation beam 168 at various beam orientations according to treatment plan 156. Controller 162 may be used to retrieve treatment plan 156 and control gantry 164, radiation source 166 and radiation beam 168 to deliver radiotherapy treatment according to treatment plan 156.

It should be understood that any suitable radiotherapy treatment delivery system(s) may be used, such as mechanic-arm-based systems, tomotherapy type systems, brachy therapy, sirex spheres, any combination thereof, etc. Additionally, examples of the present disclosure may be applicable to particle delivery systems (e.g., proton, carbon ion, etc.). Such systems may employ either a scattered particle beam that is then shaped by a device akin to an MLC, or a scanning beam of adjustable energy, spot size and dwell time. Also, OAR segmentation might be performed, and automated segmentation of the applicators might be desirable.

Figure 2:
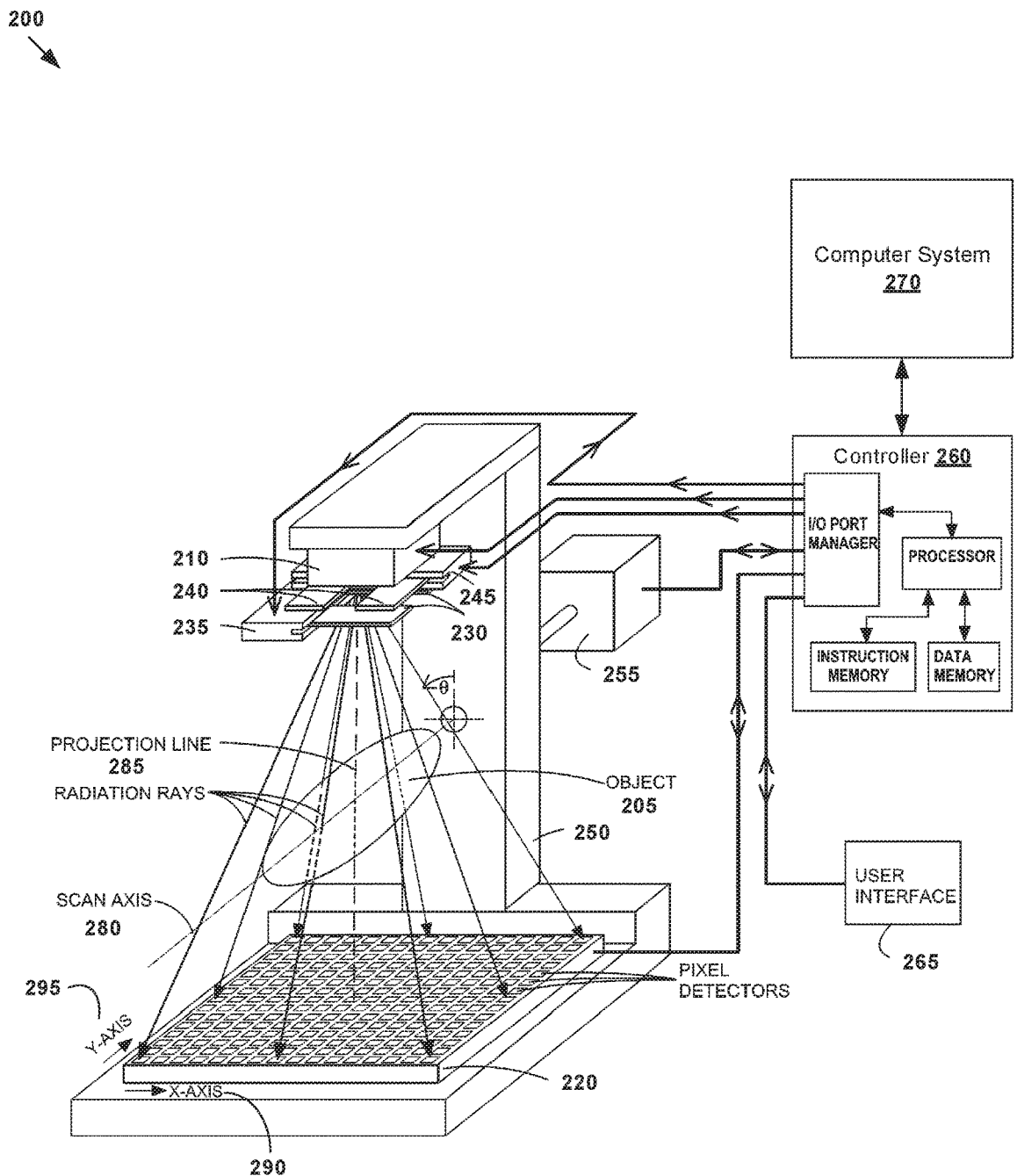
FIG. 2 is a schematic diagram illustrating an example imaging system.

FIG. 2 is a schematic diagram illustrating example imaging system 200. Although one example is shown, imaging system 200 may have alternative or additional components depending on the desired implementation in practice. In the example FIG. 2, imaging system 200 includes radiation source 210; detector 220 having pixel detectors disposed opposite to radiation source 210 along a projection line (defined below; see 285); first set of fan blades 230 disposed between radiation source 210 and detector 220; and first fan-blade drive 235 to hold fan blades 230 and set their positions.

Imaging system 200 may further include second set of fan blades 240 disposed between radiation source 210 and detector 220, and second fan-blade drive 245 that holds fan blades 240 and sets their positions. The edges of fan blades 230-240 may be oriented substantially perpendicular to scan axis 280 and substantially parallel with a trans-axial dimension of detector 220. Fan blades 230-240 are generally disposed closer to the radiation source 210 than detector 220. They may be kept wide open to enable the full extent of detector 220 to be exposed to radiation but may be partially closed in certain situations.

Imaging system 200 may further include gantry 250 that holds at least radiation source 210, detector 220, and fan-blade drives 235 and 245 in fixed or known spatial relationships to one another, mechanical drive 255 that rotates gantry 250 about target object 205 disposed between radiation source 210 and detector 220, with target object 205 being disposed between fan blades 230 and 240 on the one hand, and detector 220 on the other hand. The term "gantry" may cover all configurations of one or more structural members that can hold the above-identified components in fixed or known (but possibly movable) spatial relationships. For the sake of visual simplicity in the figure, the gantry housing, gantry support, and fan-blade support are not shown.

Additionally, imaging system 200 may include controller 260, user interface 265, and computer system 270. Controller 260 may be electrically coupled to radiation source 210, mechanical drive 255, fan-blade drives 235 and 245, detector 220, and user interface 265. User interface 265 may be configured to enable a user to at least initiate a scan of target object 205, and to collect measured projection data from detector 220. User interface 265 may be configured to present graphic representations of the measured projection data. Computer system 270 may be configured to perform any suitable operations, such as tomographic image reconstruction and analysis according to examples of the present disclosure.

Gantry 250 may be configured to rotate about target object 205 during a scan such that radiation source 210, fan blades 230 and 240, fan-blade drives 235 and 245, and detector 220 circle around target object 205. More specifically, gantry 250 may rotate these components about scan axis 280. As shown in FIG. 2, scan axis 280 intersects with projection lines 285, and is typically perpendicular to projection line 285. Target object 205 is generally aligned in a substantially fixed relationship to scan axis 280. The construction provides a relative rotation between projection line 285 on one hand, and scan axis 280 and target object 205 aligned thereto on the other hand, with the relative rotation being measured by an angular displacement value θ.

Mechanical drive 255 may be coupled to the gantry 250 to provide rotation upon command by controller 260. The array of pixel detectors on detector 220 may be periodically read to acquire the data of the radiographic projections (also referred to as "measured projection data" below). Detector 220 has X-axis 290 and Y-axis 295, which are perpendicular to each other. X-axis 290 is perpendicular to a plane defined by scan axis 280 and projection line 285, and Y-axis 295 is parallel to this same plane. Each pixel on detector 220 is assigned a discrete (x, y) coordinate along X-axis 290 and Y-axis 295. A smaller number of pixels are shown in the figure for the sake of visual clarity. Detector 220 may be centered on projection line 285 to enable full-fan imaging of target object 205, offset from projection line 285 to enable half-fan imaging of target object 205, or movable with respect to projection line 285 to allow both full-fan and half-fan imaging of target object 205.

Conventionally, the task of reconstructing 3D volume data (e.g., representing target object 205) from 2D projection data is generally non-trivial. As used herein, the term "2D projection data" (used interchangeably with "2D projection image") may refer generally to data representing properties of illuminating radiation rays transmitted through target object 205 using any suitable imaging system 200. In practice, 2D projection data may be set(s) of line integrals as output from imaging system 200. The 2D projection data may contain imaging artifacts and originate from different 3D configurations due to movement, etc. Any artifacts in 2D projection data may affect the quality of subsequent diagnosis and radiotherapy treatment planning.

Artificial Intelligence (AI) Engines

According to examples of the present disclosure, tomographic image reconstruction and analysis may be improved using AI engines. As used herein, the term "AI engine" may refer to any suitable hardware and/or software component(s) of a computer system that are capable of executing algorithms according to any suitable AI model(s). Depending on the desired implementation, "AI engine" may be a machine learning engine based on machine learning model(s), deep learning engine based on deep learning model(s), etc. In general, deep learning is a subset of machine learning in which multi-layered neural networks may be used for feature extraction as well as pattern analysis and/or classification. A deep learning engine may include a hierarchy of "processing layers" of nonlinear data processing that include an input layer, an output layer, and multiple (i.e., two or more) "hidden" layers between the input and output layers. Processing layers may be trained from end-to-end (e.g., from the input layer to the output layer) to extract feature(s) from an input and classify the feature(s) to produce an output (e.g., classification label or class).

Depending on the desired implementation, any suitable AI model(s) may be used, such as convolutional neural network, recurrent neural network, deep belief network, generative adversarial network (GAN), autoencoder(s), variational autoencoder(s), long short-term memory architecture for tracking purposes, or any combination thereof, etc. In practice, a neural network is generally formed using a network of processing elements (called "neurons," "nodes," etc.) that are interconnected via connections (called "synapses," "weight data," etc.). For example, convolutional neural networks may be implemented using any suitable architecture(s), such as UNet, LeNet, AlexNet, ResNet, VNet, DenseNet, OctNet, etc. A "processing layer" of a convolutional neural network may be a convolutional layer, pooling layer, un-pooling layer, rectified linear units (ReLU) layer, fully connected layer, loss layer, activation layer, dropout layer, transpose convolutional layer, concatenation layer, or any combination thereof, etc. Due to the substantially large amount of data associated with tomographic image data, non-uniform sampling of 3D volume data may be implemented, such as using OctNet, patch/block-wise processing, etc.

Figure 3:
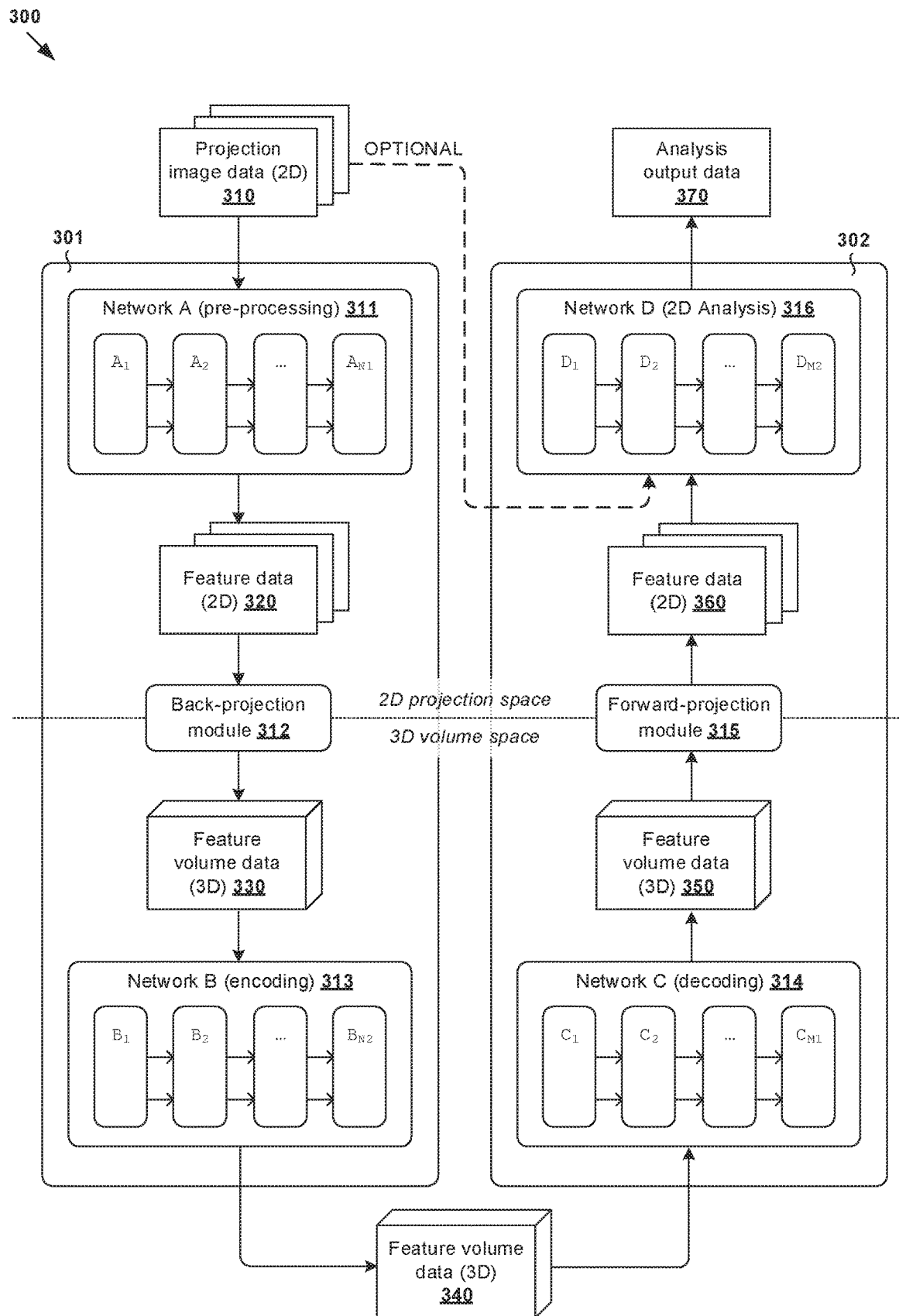
FIG. 3 is a schematic diagram for example artificial intelligence (AI) engines for tomographic image reconstruction and tomographic image analysis.

In more detail, FIG. 3 is a schematic diagram illustrating example system 300 for tomographic image reconstruction and analysis using respective AI engines 301-302. As used herein, the term "tomographic image" may refer generally to any suitable data generated by a process of computed tomography using imaging modality or modalities, such as CT, CBCT, PET, MRT, SPECT, etc. In practice, tomographic images may be 2D (e.g., slice image depicting a cross section of an object); 3D (e.g., volume data representing the object), or 4D (e.g., 3D volume data over time).

At 301 in FIG. 3 (left pathway), a first AI engine may be trained to perform tomographic image reconstruction. First AI engine 301 may include first processing layers forming a first neural network labelled "A" (see 311), an interposing back-projection module (see 312) and second processing layers forming a second neural network labelled "B" (see 313). Network "A" 311 includes multiple (N1>1) first processing layers denoted as $A_1, A_2, \ldots A_{N1}$, while network "B" 313 includes multiple (N2>1) second processing layers denoted as $B_1, B_2, \ldots B_{N2}$.

As will be described further using FIG. 4 and FIG. 5, first AI engine 301 may be trained to perform 2D-to-3D transformation by transforming input=2D projection image data (see 310) into output=3D feature volume data (see 340). During a training phase, first processing layers 311 and second processing layers 313 may be linked by back-projection module 312 and trained together. This way, during subsequent inference phase, first AI engine 301 may take advantage of data in both 2D projection space and 3D volume space during tomographic image reconstruction.

At 302 in FIG. 3 (right pathway), a second AI engine may be trained to perform tomographic image analysis. Second AI engine 302 may include first processing layers forming a first neural network labelled "C" (see 314), an interposing forward-projection module (see 315) and second processing layers forming a second neural network labelled "D" (see 316). Network "C" 314 includes multiple (M1>1) first processing layers denoted as $C_1, C_2, \ldots C_{M1}$, while network "D" 316 includes multiple (M2>1) second processing layers denoted as $D_1, D_2, \ldots D_{M2}$.

As will be described further using FIG. 6 and FIG. 7, second AI engine 302 may be trained to transform input=3D feature volume data (see 340) to 2D feature data (see 360) for analysis. During a training phase, first processing layers 314 ($C_1, C_2, \ldots C_{M1}$) and second processing layers 316 ($D_1, D_2, \ldots D_{M2}$) may be linked by forward-projection module 315 and trained together. This way, during subsequent inference phase, second AI engine 302 may take advantage of data in both 2D projection space and 3D volume space during tomographic image analysis. In practice, network "D" 316 may be trained to perform analysis based on both 2D feature data 360 and original 2D projection data 310 (see dashed line in FIG. 3).

According to examples of the present disclosure, AI engine 301/302 may learn from data in both 2D projection space and 3D volume space. This way, the transformation between the 2D projection space and the 3D volume space may be performed in a substantially lossless manner to reduce the likelihood of losing the necessary features compared to conventional reconstruction approaches. Using examples of the present disclosure, different building blocks for tomographic image reconstruction may be combined with neural networks (i.e., an example "AI engine"). Feasible fields of application may include automatic segmentation of 3D volume data or 2D projection data, object/feature detection, classification, data enhancement (e.g., completion, artifact reduction), any combination thereof, etc.

Unlike conventional approaches, examples of the present disclosure take advantage of both 3D space of volume data as well as the 2D space of projection data. Since the 2D projection data and 3D volume data are two representations of the same target object, it may be assumed that the analysis or processing may be beneficial in one or the other. In practice, output 3D volume data 340/350 may be a 3D/4D volume with CT (HU) values, dose data, segmentation/structure data, deformation vectors, 4D time-resolved volume data, any combination thereof, etc. Output 2D feature data 360 (projections) may be X-Ray intensity data, attenuation data (both potentially energy resolved), modifications thereof (removed objects), segments, any combination thereof, etc.

According to examples of the present disclosure, a first hypothesis is that raw data for tomographic images contains more information than the resulting 3D volume data. In practice, image reconstruction may be tweaked for different tasks, such as noise suppression, spatial resolution, edge enhancement, Hounsfield Units (HU) accuracy, any combination thereof, etc. These tweaks usually have tradeoffs, meaning that information that is potentially useful for any subsequent image analysis (e.g., segmentation) is lost. Other information (e.g., motion) may be suppressed by the reconstruction. In practice, once image reconstruction is performed, the 2D projection data is only reviewed in more detail after there are problems with seeing or understanding features in the 3D volume image data (e.g., metal or artifacts).

According to examples of the present disclosure, a second hypothesis is that the analysis of 2D projection data profits from knowledge about the 3D image domain. A classic example may involve a prior reconstruction with volume manipulation followed by forward projection for, for example, background subtraction and detection of a tumor. Unlike conventional approaches, the 2D-3D relationship may be intrinsic or integral part of the machine learning engine. Processing layers may learn any suitable information in 2D projection data and 3D volume data to fulfil the task.

Figure 10:
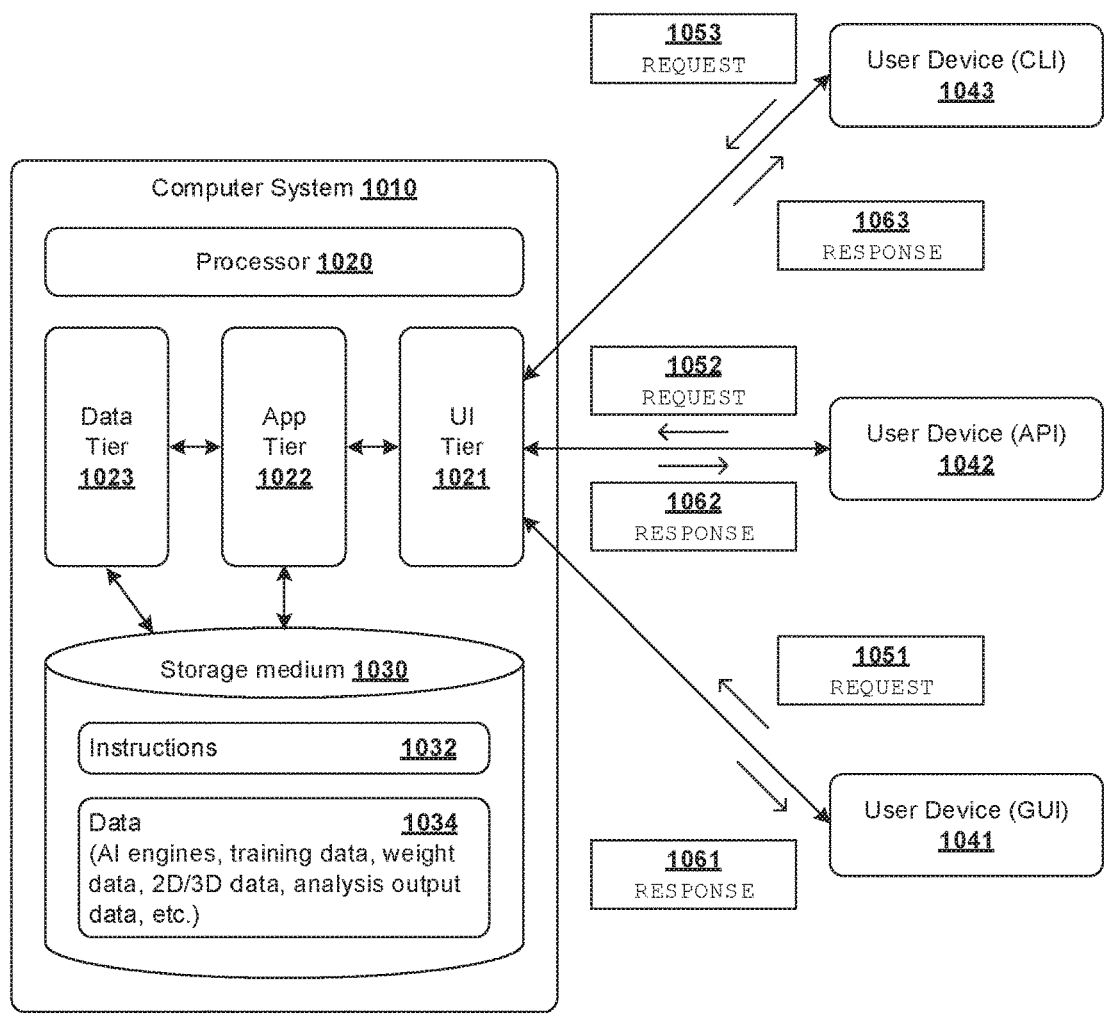
FIG. 10 is a schematic diagram of an example computer system to perform tomographic image reconstruction and/or tomographic image analysis.

Depending on the desired implementation, first AI engine 301 and second AI engine 302 may be trained and deployed independently (see FIGS. 4-7). Alternatively, first AI engine 301 and second AI engine 302 may be trained and deployed in an integrated form (see FIG. 8). First AI engine 301 and second AI engine 302 may be implemented using computer system 270, or separate computer systems. The computer system(s) may be connected to controller 260 of imaging system 200 via a local network or wide area network (e.g., Internet). As will be described using FIG. 10, computer system 270 may provide a planning-as-a-service (PaaS) for access by users (e.g., clinicians) to perform tomographic image reconstruction and/or analysis.

Tomographic Image Reconstruction

According to a first aspect of the present disclosure, first AI engine 301 in FIG. 3 may be trained to perform tomographic image reconstruction. Some examples will be explained using FIG. 4, which is a flowchart of example process 400 for a computer system to perform tomographic image reconstruction using first AI engine 301. Example process 400 may include one or more operations, functions, or actions illustrated by one or more blocks, such as 410 to 440. The various blocks may be combined into fewer blocks, divided into additional blocks, and/or eliminated based upon the desired implementation. Example process 400 may be implemented using any suitable computer system(s), an example of which will be discussed using FIG. 10.

(a) Inference Phase

Figure 4:
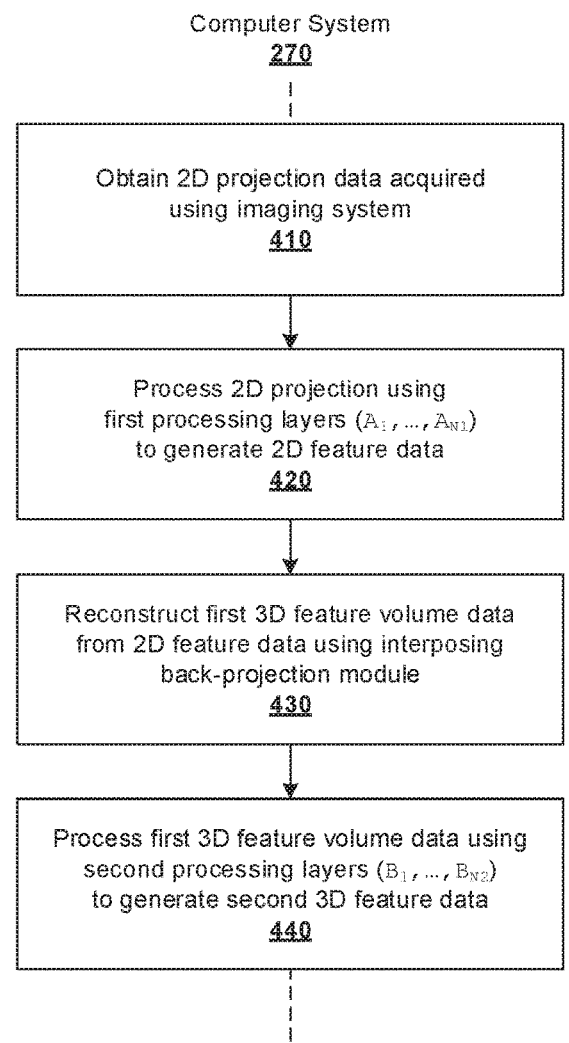
FIG. 4 is a flowchart of an example process for a computer system to perform tomographic image reconstruction using a first AI engine.

At 410 in FIG. 4, 2D projection data 310 associated with a target object (e.g., patient's anatomy) may be obtained. Here, the term "obtain" may refer generally to receiving 2D or retrieving projection data 310 from a source (e.g., controller 260, storage device, another computer system, etc.). As explained using FIG. 2, 2D projection data 310 may be acquired using imaging system 200 by rotating radiation source 210 and detector 220 about target object 205.

In practice, 2D projection data 310 may be raw data from controller 260 or pre-processed. Example pre-processing algorithms may include defect pixel correction, dark field correction, conversion from transmission integrals into attenuation integrals (e.g., log normalization with air norm), scatter correction, beam hardening correction, decimation, etc. 2D projection data 310 may be multi-channel projection data that includes various pre-processed instances and additional projections from the acquisition sequence. It should be understood that any suitable tomographic imaging modality or modalities may be used to capture 2D projection data 310, such as X-ray tomography (e.g., CT, and CBCT), PET, SPECT, MRT, etc. Although digital tomosynthesis (DTS) imaging is a no direct tomography method, the same principle may be applicable. This is because DTS also uses the relative geometry between the projections to calculate a relative 3D reconstruction with limited (dependent on the scan arc angle) resolution in imaging direction.

At 420 in FIG. 4, 2D projection data 310 may be processed using first processing layers ($A_1, A_2, \ldots A_{N1}$) of pre-processing network "A" 311 to generate 2D feature data 320. In practice, network "A" 311 may include a convolutional neural network with convolutional layer(s), pooling layer(s), etc. All projections in 2D projection data 310 may be processed using network "A" 311, or several instances for different subsets of the projections.

At 430 in FIG. 4, first 3D feature volume data 330 may be reconstructed from 2D feature data 320 using back-projection module 312. As used herein, "back projection" may refer generally to transformation from 2D projection space to 3D volume space. Any suitable reconstruction algorithm(s) may be implemented by back-projection module 312, such as non-iterative reconstruction (e.g., filtered back-projection), iterative reconstruction (e.g., algebraic and statistical based reconstruction), etc. In practice, 2D feature data 320 may represent a multi-channel output of network "A" 311. In this case, back-projection module 312 may perform multiple back-projection operations on respective channels to form the corresponding 3D feature volume data 330 with a multi-channel 3D representation.

At 440 in FIG. 4, first 3D feature volume data 330 may be processed using second processing layers $(B_1, B_2, \ldots, B_{N2})$ of network "B" 313 to generate second 3D feature volume data 340. Depending on the desired implementation, network "B" 313 may be implemented based on a UNet architecture. Having a general "U" shape, the left path of UNet is known as an "encoding path" or "contracting path," where high-order features are extracted at several down-sampled resolutions.

In one example, network "B" 313 may be configured to implement the encoding path of UNet, in which case second processing layers $(B_1, B_2, \ldots, B_{N2})$ may include convolution layer(s) and pooling layer(s) forming a volume processing chain. Network "B" 313 may be seen as a type of encoder that finds another representation of 2D projection data 310. As will be discussed using FIG. 6, the right path of UNet is known as a "decoding path" or "expansive path," and may be implemented by network "C" 314 of second AI engine 302.

(b) Training Phase

Figure 5:
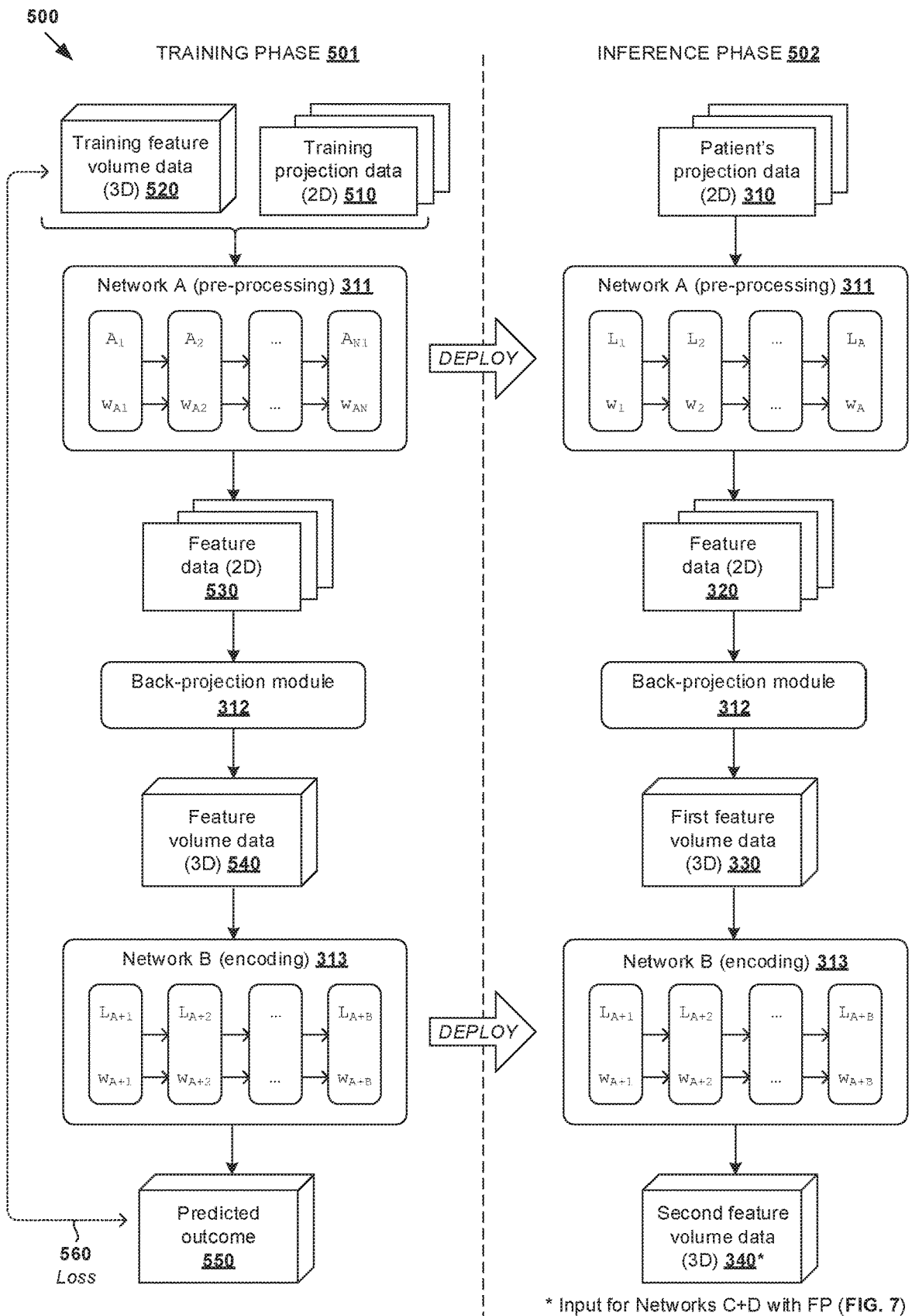
FIG. 5 is a schematic diagram illustrating example training phase and inference phase of a first AI engine for tomographic image reconstruction.

FIG. 5 is a schematic diagram illustrating example 500 of training phase and inference phase of first AI engine 301 for tomographic image reconstruction. During training phase 501, first processing layers $(A_1, A_2, \ldots, A_{N1})$ of network "A" 311 and second processing layers $(B_1, B_2, \ldots, B_{N2})$ of network "B" 313 may be linked by back-projection module 312 and trained together to learn associated weight data. Based on training data 510-520, first AI engine 301 may learn first weight data $(W_{A1}, W_{A2}, \ldots, W_{AN})$ associated with first processing layers $(A_1, A_2, \ldots, A_{N1})$, and second weight data $(W_{B1}, W_{B2}, \ldots, W_{BN})$ associated with second processing layers $(B_1, B_2, \ldots, B_{N2})$.

Depending on the desired implementation, network "A" 311 and network "B" 313 may be trained using a supervised learning approach. The aim of training phase 501 is to train AI engine 301 to map input training data=2D projection data 510 to output training data=3D feature volume data 520, which represents the desired outcome or belonging volume. In practice, 3D feature volume data 520 represents labels for supervised learning, and annotations such as contours may be used as labels. For each iteration, a subset or all of 2D projection data 510 may be processed using network "A" 311 to generate 2D feature data 530, back-projection module 312 to generate 3D feature volume data 540 and network "B" 313 to generate a predicted outcome (see 550).

Training phase 501 in FIG. 5 may be guided by estimating and minimizing a loss between predicted outcome 550 and desired outcome specified by output training data 520. See comparison operation at 560 in FIG. 5. This way, first weight data $(W_{A1}, W_{A2}, \ldots, W_{AN})$ and second weight data $(W_{B1}, W_{B2}, \ldots, W_{BN})$ may be improved during training phase 501, such as through backward propagation of loss, etc. A simple example of a loss function would be mean squared error between true and predicted outcome, but the loss function could have more complex formulas (e.g., dice loss, jaccard loss, focal loss, etc.). This loss can be estimated from the output of the model, or from any discrete point within the model.

Depending on the desired implementation, network "A" 311 may be trained to perform pre-processing on 2D projection data 310, such as by applying convolution filter(s) on 2D projection data 310, etc. In general, network "A" 311 may learn any suitable feature transformation that is necessary to enable network "B" 313 to generate its output (i.e., second 2D feature volume data 350). Using the Feldkamp-Davis-Kress (FDK) reconstruction algorithm, for example, network "A" 311 may be trained to learn a convolution filter part of the FDK algorithm. In this case, network "B" 313 may be trained to generate second 2D feature volume data 350 that represents a 3D FDK reconstruction output. During training phase 501, network "A" 311 may learn any suitable task(s) that may be best performed on the line integrals based on 2D projection data 310 in the 2D projection space.

Once trained and validated, first AI engine 301 may be deployed to perform tomographic image reconstruction for current patient(s) during inference phase 502. As described using FIG. 3 and FIG. 4, first AI engine 301 may operate in both 2D projection space and 3D volume space to transform input=2D projection data 310 into output=feature volume data 340 using network "A" 311, back-projection module 312 and network "B" 313. Various examples associated with the 2D-to-3D transformation using first AI engine 301 have been discussed using FIG. 3 and FIG. 4 and will not be repeated here for brevity.

Depending on the desired implementation, network "B" 313 in FIG. 3 and FIG. 5 may represent a combination of both encoding network "B" 313 and decoding network "C" 314. These networks 313-314 collectively form an auto-encoding network to find a 3D representation of 2D projection data 310 in the form of output=3D feature volume data 340/350. Once trained and validated, tomographic image reconstruction may be performed using network "A" 311, back-projection module 212, and combined network 313-314. Depending on the desired implementation, the final output (i.e., feature volume data 340/350) of combined network 313-314 may be used as an input to AI engine(s) or algorithm(s) for 3D analysis. The output of the combined network 313-314 may also include 4D time-resolved volume data or other suitable representation.

Tomographic Image Analysis

According to a second aspect of the present disclosure, second AI engine 302 in FIG. 3 may be trained to perform tomographic image analysis. Some examples will be explained using FIG. 6, which is a flowchart of example process 600 for a computer system to perform tomographic image analysis using second AI engine 302. Example process 600 may include one or more operations, functions, or actions illustrated by one or more blocks, such as 610 to 640. The various blocks may be combined into fewer blocks, divided into additional blocks, and/or eliminated based upon the desired implementation. Example process 600 may be implemented using any suitable computer system(s), an example of which will be discussed using FIG. 10. In the following, input feature volume data 340 and output feature volume data 350 will be used as example "first" and "second" 3D "feature volume data" from the perspective of network "C" 314.

(a) Inference Phase

Figure 6:
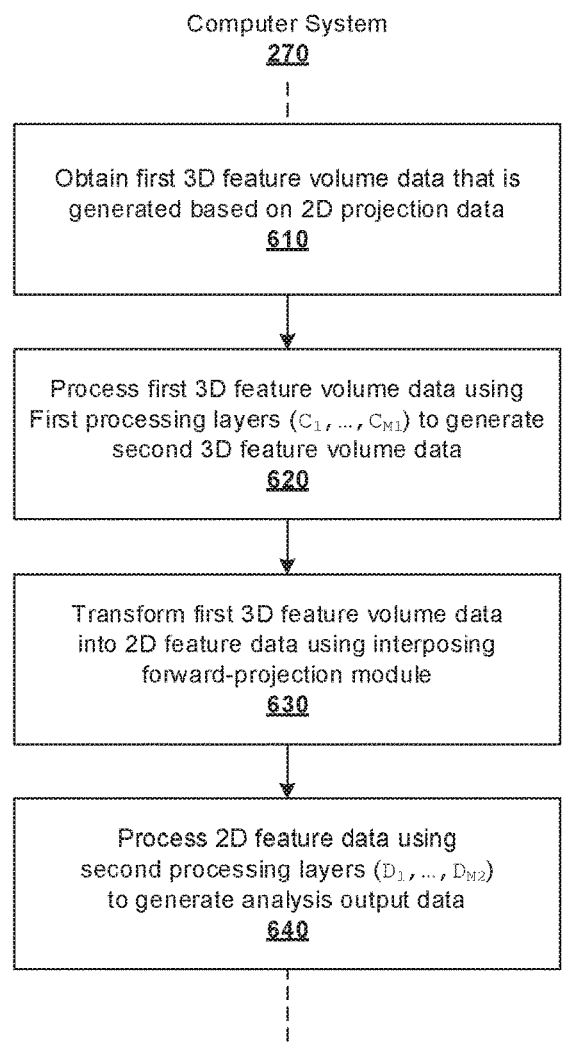
FIG. 6 is a flowchart of an example process for a computer system to perform tomographic image analysis using a second AI engine.

At 610 in FIG. 6, input=3D feature volume data 340 may be obtained. In one example, input 3D feature volume data 340 may be an output of first AI engine 301, or algorithmic equivalent(s) thereof. In the latter case, any suitable algorithm(s) may be used, such as 3D or 4D reconstruction algorithm, etc. The term "obtain" may refer generally to receiving or retrieving 3D feature volume data 340 from a source (e.g., first AI engine 301, storage device, another computer system, etc.). Input 3D feature volume data 340 may be generated based on 2D projection data 210 acquired using imaging system 200 by rotating radiation source 210 and detector 220 about target object 205.

At 620 in FIG. 6, input 3D feature volume data 340 may be processed using first processing layers ($C_1, C_2, \ldots, C_{M1}$) of network "C" 314 to generate output 3D feature volume data 350. In general, network "C" 314 is trained to prepare features that may be forward-projected by forward-projection module 315 and processed by network "D" 316, such as to reproduce input projections or segments. Depending on the desired implementation, network "C" 314 may be implemented based on a UNet architecture. The right path of UNet is known as a "decoding path" or "expansive path," where features at lower resolution are upsampled to a higher resolution.

In one example, network "C" 314 may be configured to implement a decoding path, in which case first processing layers ($C_1, C_2, \ldots, C_{M1}$) may include convolution layer(s) and un-pooling layer(s). When connected with network "B" 313 in FIG. 3, both networks 313-314 may be seen as a type of encoder-decoder by using network "B" 313 to encode and network "C" 314 to decode. In this case, output=3D feature volume data 350 may have a potentially higher (up-sampled) resolution or denoised, higher dimensional features compared to input=3D feature volume data 340 of network "C" 314 (i.e., output of network "B" 313).

At 630 in FIG. 6, 3D feature volume data 350 (i.e., output of network "C" 314) may be forward-projected or transformed into 2D feature data 360 using forward-projection module 315. As used herein, "forward projection" may refer generally to a transformation from the 3D volume space to the 2D projection space. Forward projection (also known as synthesizing projection data) may include data such as attenuation path integrals (primary signal), Rayleigh scatter and Compton scatter. Forward projection module 315 may implement any suitable algorithm(s), such as monochromatic or polychromatic; source-driven or destination-drive; voxel-based or blob-based; and use Ray Tracing, Monte Carlo, finite element methods, etc.

At 640 in FIG. 6, 2D feature data 360 may be processed using second processing layers ($D_1, D_2, \ldots, D_{M2}$) of network "D" 316 to generate analysis output data. Depending on the analysis performed by network "D", any suitable architecture may be used, such as UNet, LeNet, AlexNet, ResNet, V-net, DenseNet, etc. Example analysis performed by network "D" 316 will be discussed below.

(b) Training Phase

Figure 7:
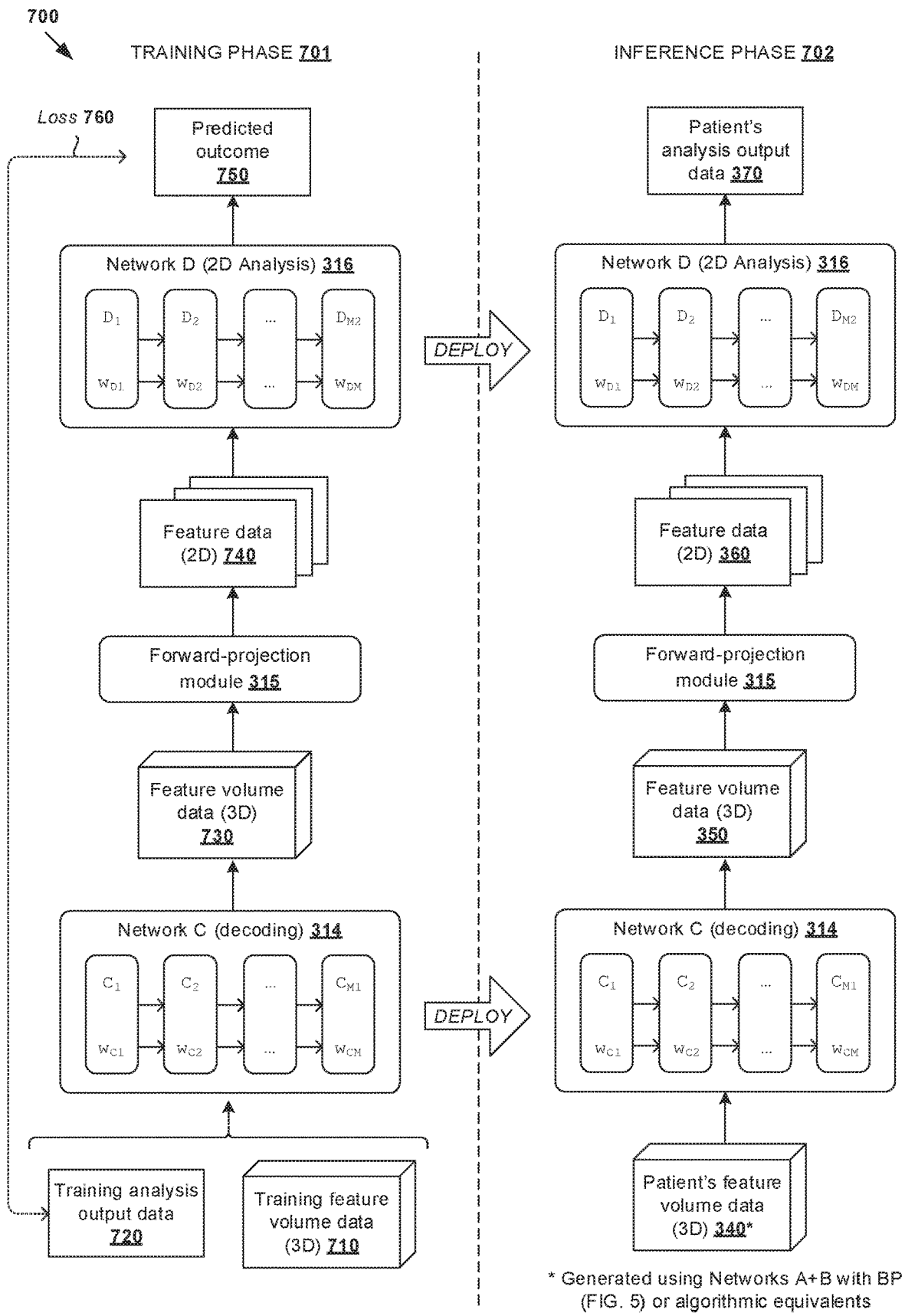
FIG. 7 is a schematic diagram illustrating example training phase and inference phase of a second AI engine for tomographic image analysis.

FIG. 7 is a schematic diagram illustrating example 700 of training phase and inference phase of second AI engine 302 for tomographic image analysis. During training phase 701, first processing layers ($C_1, C_2, \ldots, C_{M1}$) of network "C" 314 and second processing layers ($D_1, D_2, \ldots, D_{M2}$) of network "D" 316 may be linked by forward-projection module 315 and trained together to learn associated weight data. Based on training data 710-720, first AI engine 301 may learn first weight data ($W_{C1}, W_{C2}, \ldots, W_{CM}$) associated with first processing layers ($C_1, C_2, \ldots, C_{M1}$), and second weight data ($W_{D1}, W_{D2}, \ldots, W_{DM}$) associated with second processing layers ($D_1, D_2, \ldots, D_{M2}$).

Depending on the desired implementation, network "C" 314 and network "D" 316 may be trained using a supervised learning approach. The aim of training phase 701 is to train AI engine 302 to map input training data=3D feature volume data 710 to output training data=analysis output data 720, which represents the desired outcome. For each iteration, a subset of 3D feature volume data 710 may be processed using (a) network "C" 314 to generate decoded 3D feature volume data 730, (b) forward-projection projection module 315 to generate 2D feature data 740 and (c) network "D" 316 to generate a predicted outcome (see 750).

Similar to the example in FIG. 5, training phase 701 in FIG. 7 may be guided by estimating and minimizing a loss between predicted outcome 750 and desired outcome specified by output training data 720. See comparison operation at 760 in FIG. 7. This way, first weight data ($W_{C1}, W_{C2}, \ldots, W_{CM}$) and second weight data ($W_{D1}, W_{D2}, \ldots, W_{DM}$) may be improved during training phase 701, such as through backward propagation of loss, etc. Again, a simple loss function (e.g., mean squared error) or more complex function(s) may be used.

Depending on the desired implementation, network "D" 316 may be trained using training data 710-720 to generate analysis output data associated with one or more of the following: automatic segmentation, object detection (e.g., organ or bone), feature detection (e.g., edge/contour of an organ, 3D small-scale structure located within bone(s) such as skull, etc.), image artifact suppression, image enhancement (e.g., resolution enhancement using super-resolution), de-truncation by learning volumetric image content (voxels), prediction of moving 2D segments, object or tissue removal (e.g., bone, patient's table or immobilization devices, etc.), any combination thereof, etc. These examples will also be discussed further below.

Once trained and validated, second AI engine 302 may be deployed to perform tomographic image analysis for current patient(s) during inference phase 702. As described using FIG. 3 and FIG. 6, second AI engine 302 may operate in both 2D projection space and 3D volume space to transform input=3D feature volume data 340 into output=analysis output data 370 using network "C" 314, forward-projection module 315 and network "D" 316. Example details relating to tomographic image analysis using second AI engine 302 have been discussed using FIG. 3 and FIG. 6 and will not be repeated here for brevity.

Integrated Tomographic Image Reconstruction and Analysis

According to a third aspect of the present disclosure, first and second AI engines 301-302 in FIG. 3 may be trained together to perform integrated tomographic image reconstruction and analysis. Some examples will be discussed using FIG. 8, which is a schematic diagram illustrating example training phase 800 of AI engines 301-302 for integrated tomographic image reconstruction and analysis.

Figure 8:
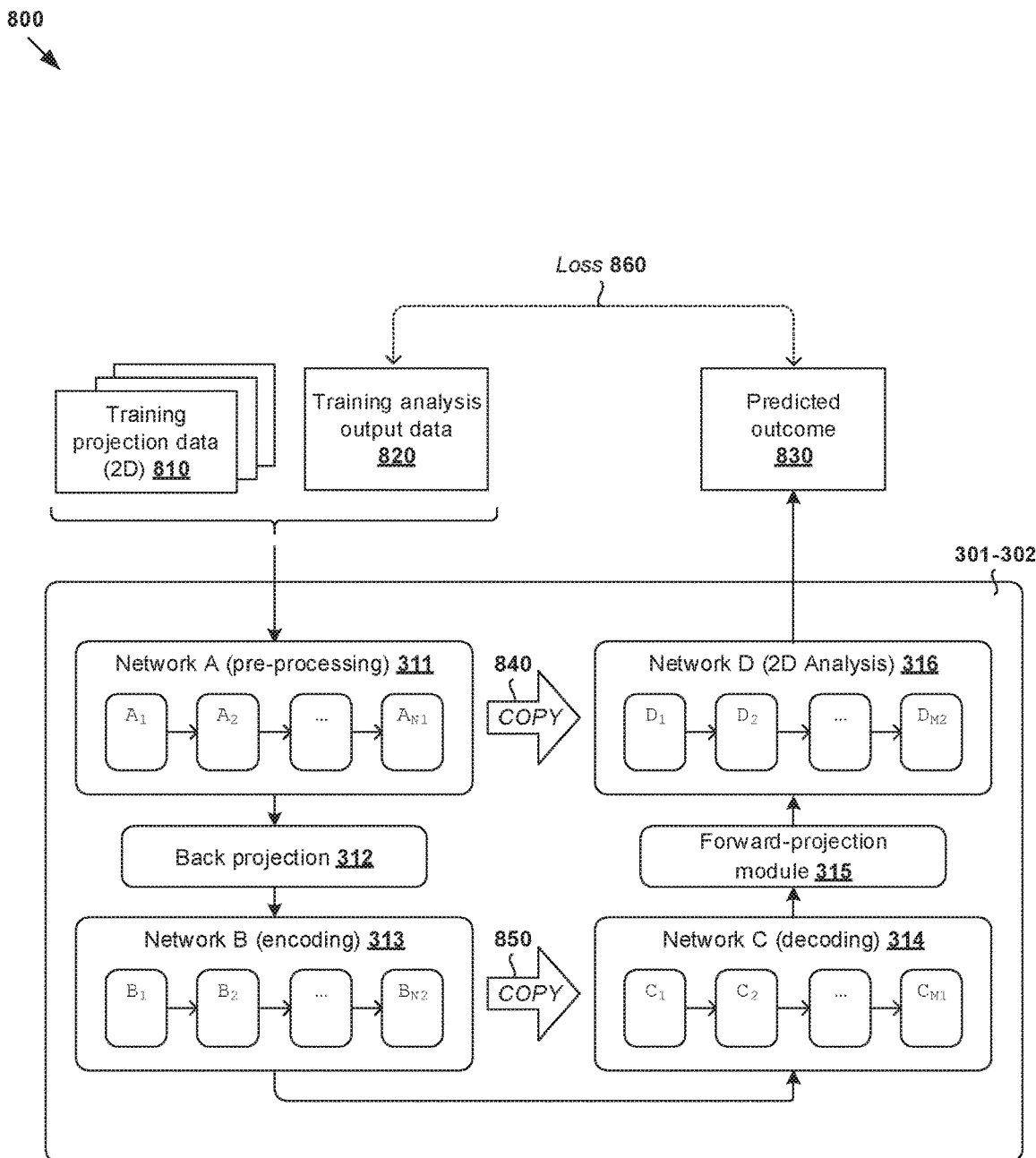
FIG. 8 is a schematic diagram illustrating example training phase of AI engines for integrated tomographic image reconstruction and analysis.

In the example in FIG. 8, AI engines 301-302 may be connected to form an integrated AI engine, which includes networks "A" 311 and "B" 313 that are interposed with back-projection module 312, followed by networks "C" 314 and "D" 316 that are interposed with forward-projection module 315. The aim of training phase 801 is to train integrated AI engine 301-302 to map input training data=2D projection data 810 to output training data=analysis output data 820, which represents the desired outcome. For each iteration, a subset of 2D projection data 810 may be processed using network "A" 311, back-projection module 312, network "B" 313, network "C" 314, forward-projection module 315 and network "D" 316 to generate a predicted outcome (see 830).

Training phase 801 in FIG. 8 may be guided by estimating and minimizing a loss between predicted outcome 830 and desired outcome specified by output training data 820. Using an end-to-end training approach, weight data associated with respective networks 311, 313-314 and 316 may be improved, such as through backward propagation of loss, etc. By embedding both back-projection module 312 and forward-projection module 315, training phase 901 may be guided by end-to-end loss function(s) in 2D projection space and/or 3D volume space. See comparison 860 between output training data 820 and predicted outcome 830 in FIG. 8.

In the example in FIG. 8, an optional copy of data from first AI engine 301 may be transported to second AI engine 302 to "skip" processing layer(s) in between. This provides shortcuts for the data flow, such as to let high-frequency features skip or bypass lower levels of a neural network. In one example (see 840), an optional copy of data from one processing layer ($A_i$) in network "A" 311 may be provided to another processing layer ($D_j$) in network "D" 316. A practical scenario would be scatter data that is removed by network "A" 311 skips networks "B" 313 and "C" 314 and added again to reproduce the input projections or patient motion removed by network "B" 313. This way, static image data may be generated and network "C" 314 may reproduce the input. In another example (see 850), an optional copy of data from one processing layer ($B_i$) in network "B" 313 may be provided to another processing layer ($C_j$) in network "C" 314. This skipping approach is one of the possibilities provided by convolution neural networks provide the possibility to skip layers.

Depending on the desired implementation, first AI engine 301 and/or second AI engine 302 in FIGS. 3-8 may be implemented to facilitate at least one of the following:

(a) Identifying imaging artifact(s) associated with 2D projection data 310 and/or 3D feature volume data 340/350, such as when the exact source of artifact(s) is unknown. In one approach, an auto-encoding approach may be implemented using both AI engines 301-302. The loss function used during training phase 701 may be used to ensure 2D projection data 310 and analysis output data 370 are substantially the same, and volume data 330-350 in between is of the desired quality (e.g., reduced noise or motion artifacts). Another approach is to provide an ideal reconstruction as label and train the model to predict substantially artifact-free volume data from reduced or deteriorated (e.g., simulated noise or scatter) projection data.

(b) Identifying region(s) of movement associated with 2D projection data 310 and/or 3D feature volume data 340/350. In this case, training data 710-720 may include 2D/3D information where motion occurs to train network "D" 316 to identify region(s) of movement.

(c) Identifying region(s) with an artifact associated with 2D projection data 310 and/or 3D feature volume data 340/350. In this case, training data 710-720 may include segmented artifacts to train network "D" 316 to identify region(s) with artifacts.

(d) Identifying anatomical structure(s) and/or non-anatomical structure(s) from 2D projection data 310 and/or 3D feature volume data 340/350. Through automatic segmentation, anatomical structure(s) such as tumor(s) and organ(s) may be identified. Non-anatomical structure(s) may include implant(s), fixation device(s) and other materials in 2D/3D image regions. In this case, training data 710-720 may include data identifying such anatomical structure(s) and/or non-anatomical structure(s).

(e) Reducing noise associated with 2D projection data 310 and/or 3D feature volume data 340/350. In practice, this may involve identifying a sequence of projections for further processing, such as marker tracking, soft tissue tracking.

(f) Tracking movement of a patient's structure identifiable from 2D projection data 310 or 3D feature volume data 340/350. A feasible output of first AI engine 301 and second AI engine 302 may be a set of projections where each pixel indicates the probability of identifying a fiducial (or any other structure) center point or segment. This would provide the position of the structure for each projection. Advantage of this approach is that occurrence probability may be combined in 3D volume space to make a dependent 2D prediction for each projection. Any suitable tracking approach may be used, such as using 3D volume data in the form of long short-term memory (LSTM), etc.

(g) Binning 2D slices associated with 2D projection data 310 to different movement bins (or phases). By identifying the bins, network "D" 316 may be trained to use data belonging to certain bin.

(h) Generating 4D image data with movement associated with 2D projection data 310 or 3D feature volume data 340/350. In this case, network "D" 316 may be trained to compute one volume with several channels (4D) for different bins in (g) to resolve motion. Other possibilities include using a variational auto-encoder in 3D volume space (e.g., networks "B" 313 and "C" 314) to learn a deformation model.

Automatic segmentation using AI engines 301-302 should be contrasted against conventional manual approaches. For example, it usually requires a team of highly skilled and trained oncologists and dosimetrists to manually delineate structures of interest by drawing contours or segmentations on image data 120. These structures are manually reviewed by a physician, possibly requiring adjustment or re-drawing. In many cases, the segmentation of critical organs can be the most time-consuming part of radiation treatment planning. After the structures are agreed upon, there are additional labor-intensive steps to process the structures to generate a clinically-optimal treatment plan specifying treatment delivery data such as beam orientations and trajectories, as well as corresponding 2D fluence maps. These steps are often complicated by a lack of consensus among different physicians and/or clinical regions as to what constitutes "good" contours or segmentation. In practice, there might be a huge variation in the way structures or segments are drawn by different clinical experts. The variation may result in uncertainty in target volume size and shape, as well as the exact proximity, size and shape of OARs that should receive minimal radiation dose. Even for a particular expert, there might be variation in the way segments are drawn on different days.

Example Treatment Plan

Figure 9:
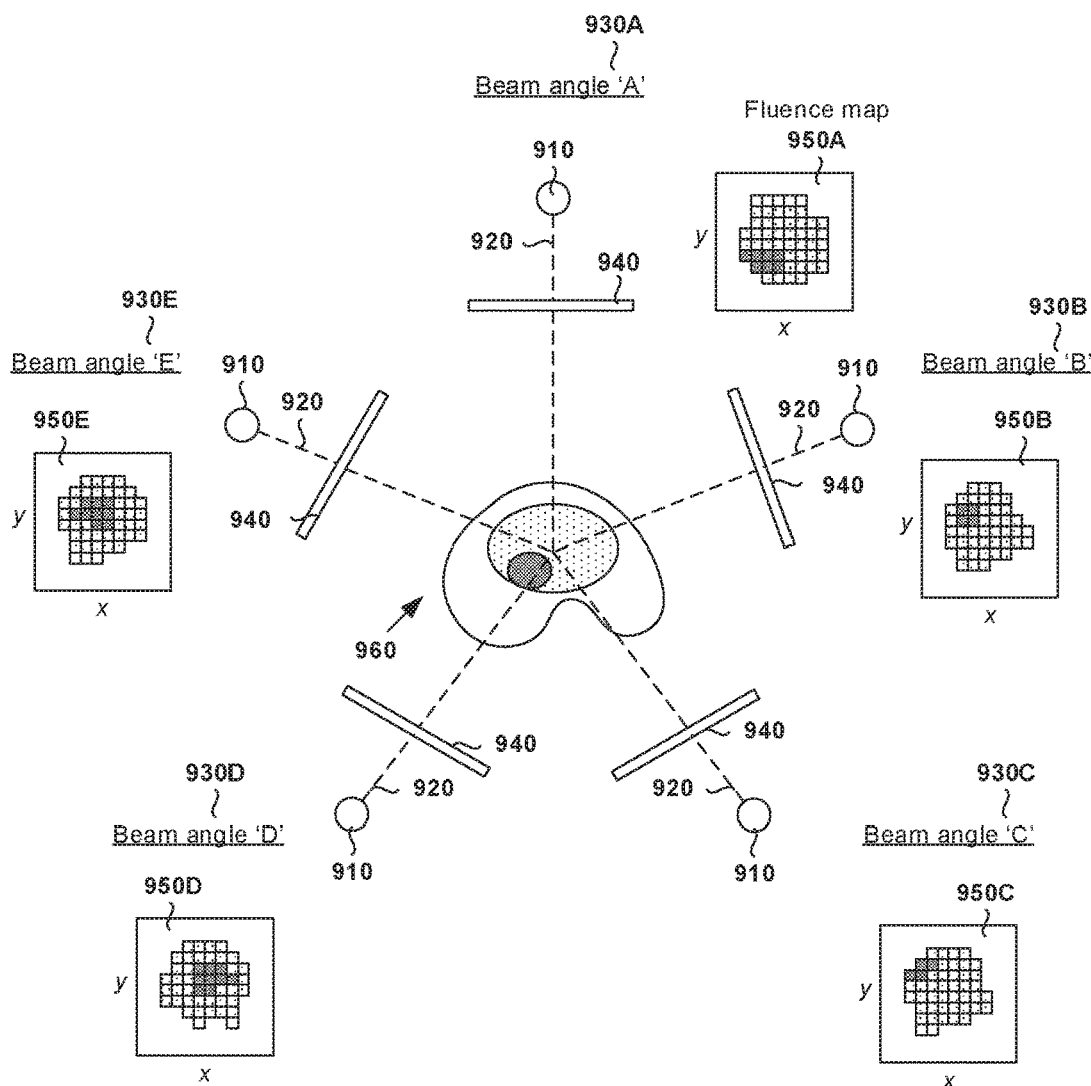
FIG. 9 is a schematic diagram of an example treatment plan for radiotherapy treatment delivery.

FIG. 9 is a schematic diagram of example treatment plan 156/900 generated or improved based on output data(s) of AI engine 301/302 in FIG. 3. Treatment plan 156 may be delivered using any suitable treatment delivery system that includes radiation source 910 to project radiation beam 920 onto treatment volume 960 representing the patient's anatomy at various beam angles 930.

Although not shown in FIG. 9 for simplicity, radiation source 910 may include a linear accelerator to accelerate radiation beam 920 and a collimator (e.g., MLC) to modify or modulate radiation beam 920. In another example, radiation beam 920 may be modulated by scanning it across a target patient in a specific pattern with various energies and dwell times (e.g., as in proton therapy). A controller (e.g., computer system) may be used to control the operation of radiation source 920 according to treatment plan 156.

During treatment delivery, radiation source 910 may be rotatable using a gantry around a patient, or the patient may be rotated (as in some proton radiotherapy solutions) to emit radiation beam 920 at various beam orientations or angles relative to the patient. For example, five equally-spaced beam angles 930A-E (also labelled "A," "B," "C," "D" and "E") may be selected using a deep learning engine configured to perform treatment delivery data estimation. In practice, any suitable number of beam and/or table or chair angles 930 (e.g., five, seven, etc.) may be selected. At each beam angle, radiation beam 920 is associated with fluence plane 940 (also known as an intersection plane) situated outside the patient envelope along a beam axis extending from radiation source 910 to treatment volume 960. As shown in FIG. 9, fluence plane 940 is generally at a known distance from the isocenter.

In addition to beam angles 930A-E, fluence parameters of radiation beam 920 are required for treatment delivery. The term "fluence parameters" may refer generally to characteristics of radiation beam 920, such as its intensity profile as represented using fluence maps (e.g., 950A-E for corresponding beam angles 930A-E). Each fluence map (e.g., 950A) represents the intensity of radiation beam 920 at each point on fluence plane 940 at a particular beam angle (e.g., 930A). Treatment delivery may then be performed according to fluence maps 950A-E, such as using IMRT, etc. The radiation dose deposited according to fluence maps 950A-E should, as much as possible, correspond to the treatment plan generated according to examples of the present disclosure.

Computer System

Examples of the present disclosure may be deployed in any suitable manner, such as a standalone system, web-based planning-as-a-service (PaaS) system, etc. In the following, an example computer system (also known as a "planning system") will be described using FIG. 10, which is a schematic diagram illustrating example network environment 1000 in which tomographic image reconstruction and/or tomographic image analysis may be implemented. Depending on the desired implementation, network environment 1000 may include additional and/or alternative components than that shown in FIG. 10. Examples of the present disclosure may be implemented by hardware, software or firmware or a combination thereof.

Processor 1020 is to perform processes described herein with reference to FIG. 1 to FIG. 9. Computer-readable storage medium 1030 may store computer-readable instructions 1032 which, in response to execution by processor 1020, cause processor 1020 to perform various processes described herein. Computer-readable storage medium 1030 may further store any suitable data 1034, such as data relating to AI engines, training data, weight data, 2D projection data, 3D volume data, analysis output data, etc. In the example in FIG. 10, computer system 1010 may be accessible by multiple user devices 1041-1043 via any suitable physical network (e.g., local area network, wide area network, etc.) In practice, user devices 1041-1043 may be operated by various users located at any suitable clinical site(s).

Computer system 1010 may be implemented using a multi-tier architecture that includes web-based user interface (UI) tier 1021, application tier 1022, and data tier 1023. UI tier 1021 may be configured to provide any suitable interface (s) to interact with user devices 1041-1043, such as graphical user interface (GUI), command-line interface (CLI), application programming interface (API) calls, any combination thereof, etc. Application tier 1022 may be configured to implement examples of the present disclosure. Data tier 1023 may be configured to facilitate data access to and from storage medium 1030. By interacting with UI tier 1021, user devices 1041-1043 may generate and send respective service requests 1051-1053 for processing by computer system 1010. In response, computer system 1010 may perform examples of the present disclosure generate and send service responses 1061-1063 to respective user devices 1041-1043.

Depending on the desired implementation, computer system 1010 may be deployed in a cloud computing environment, in which case multiple virtualized computing instances (e.g., virtual machines, containers) may be configured to implement various functionalities of tiers 1021-1023. The cloud computing environment may be supported by on premise cloud infrastructure, public cloud infrastructure, or a combination of both. Computer system 1010 may be deployed in any suitable manner, including a service-type deployment in an on-premise cloud infrastructure, public cloud infrastructure, a combination thereof, etc. Computer system 1010 may represent a computation cluster that includes multiple computer systems among which various functionalities are distributed. Computer system 1010 may include any alternative and/or additional component(s) not shown in FIG. 10, such as graphics processing unit (GPU), message queues for communication, blob storage or databases, load balancer(s), specialized circuits, etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Throughout the present disclosure, the terms "first," "second," "third," etc. do not denote any order of importance, but are rather used to distinguish one element from another.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the present disclosure has been described with reference to specific exemplary embodiments, it will be recognized that the disclosure is not limited to the embodiments described, but can be practiced with modification and alteration within the spirit and scope of the appended claims.

Accordingly, the specification and drawings are to be regarded in an illustrative sense rather than a restrictive sense.

We claim:

1. A method for a computer system to perform tomographic data analysis using an artificial intelligence (AI) engine, wherein the method comprises:

obtaining first three-dimensional (3D) feature volume data generated based on two-dimensional (2D) projection data that is associated with a target object and acquired using an imaging system;

processing the first 3D feature volume data using the AI engine that includes multiple first processing layers, an interposing forward-projection module and multiple second processing layers by performing the following:

generating second 3D feature volume data by processing the first 3D feature volume data using the multiple first processing layers that are associated with first weight data and operate in a 3D volume space;

transforming the second 3D volume data into 2D feature data using the forward-projection module; and generating analysis output data by processing the 2D feature data using the multiple second processing layers that are associated with second weight data and operate in a 2D projection space.

2. The method of claim 1, wherein generating the second 3D feature volume data comprises:

generating second 3D feature volume data by processing the first 3D feature volume data using the multiple first processing layers that are trained to perform decoding on the first 3D feature volume data.

3. The method of claim 1, wherein generating the analysis output data comprises:

generating the analysis output data by processing the 2D feature data using the multiple second processing layers that are trained to perform at least one of the following: automatic segmentation, object or feature detection, image artifact suppression, image enhancement and de-truncation.

4. The method of claim 3, wherein processing the 2D projection data using the AI engine comprises:

generating the analysis output data by processing both the 2D feature data and the 2D projection data using the multiple second processing layers.

5. The method of claim 1, wherein the method further comprises:

obtaining training data that includes (a) training 3D feature volume data and (b) training analysis output data; and training the multiple first processing layers and the multiple second processing layers, with the forward-projection module interposed in between, to transform (a) the training 3D feature volume data and (b) the training analysis output data and to learn the respective first weight data and second weight data.

6. The method of claim 1, wherein obtaining the first 3D feature volume data comprises:

obtaining the first 3D feature volume data for processing by the AI engine, being a second AI engine, from a first AI engine that is trained to perform tomographic image reconstruction to transform the 2D projection data to the first 3D feature volume data.

7. The method of claim 6, wherein the method further comprises:

obtaining training data that includes (a) training 2D projection data and (b) training analysis output data; and training the first AI engine and the second AI engine together to perform integrated tomographic image reconstruction and analysis to transform (a) the training 2D projection data to (b) the training analysis output data.

8. A non-transitory computer-readable storage medium that includes a set of instructions which, in response to execution by a processor of a computer system, cause the processor to perform a method of tomographic data analysis using an artificial intelligence (AI) engine, wherein the method comprises:

obtaining first three-dimensional (3D) feature volume data generated based on two-dimensional (2D) projection data that is associated with a target object and acquired using an imaging system;

processing the first 3D feature volume data using the AI engine that includes multiple first processing layers, an interposing forward-projection module and multiple second processing layers by performing the following:

generating second 3D feature volume data by processing the first 3D feature volume data using the multiple first processing layers that are associated with first weight data and operate in a 3D volume space;

transforming the second 3D volume data into 2D feature data using the forward-projection module; and generating analysis output data by processing the 2D feature data using the multiple second processing layers that are associated with second weight data and operate in a 2D projection space.

9. The non-transitory computer-readable storage medium of claim 8, wherein generating the second 3D feature volume data comprises:

generating second 3D feature volume data by processing the first 3D feature volume data using the multiple first processing layers that are trained to perform decoding on the first 3D feature volume data.

10. The non-transitory computer-readable storage medium of claim 8, wherein generating the analysis output data comprises:

generating the analysis output data by processing the 2D feature data using the multiple second processing layers that are trained to perform at least one of the following: automatic segmentation, object or feature detection, image artifact suppression, image enhancement and de-truncation.

11. The non-transitory computer-readable storage medium of claim 10, wherein processing the 2D projection data using the AI engine comprises:

generating the analysis output data by processing both the 2D feature data and the 2D projection data using the multiple second processing layers.

12. The non-transitory computer-readable storage medium of claim 8, wherein the method further comprises:

obtaining training data that includes (a) training 3D feature volume data and (b) training analysis output data; and training the multiple first processing layers and the multiple second processing layers, with the forward-projection module interposed in between, to transform (a) the training 3D feature volume data and (b) the training analysis output data.

13. The non-transitory computer-readable storage medium of claim 8, wherein obtaining the first 3D feature volume data comprises:
obtaining the first 3D feature volume data for processing by the AI engine, being a second AI engine, from a first AI engine that is trained to perform tomographic image reconstruction to transform the 2D projection data to the first 3D feature volume data and to learn the respective first weight data and second weight data.

14. The non-transitory computer-readable storage medium of claim 13, wherein the method further comprises:
obtaining training data that includes (a) training 2D projection data and (b) training analysis output data; and
training the first AI engine and the second AI engine together to perform integrated tomographic image reconstruction and analysis to transform (a) the training 2D projection data to (b) the training analysis output data.

15. A computer system configured to perform tomographic data analysis using an artificial intelligence (AI) engine, wherein the computer system comprises: a processor and a non-transitory computer-readable medium having stored thereon instructions that, when executed by the processor, cause the processor to:
obtain first three-dimensional (3D) feature volume data generated based on two-dimensional (2D) projection data that is associated with a target object and acquired using an imaging system;
process the first 3D feature volume data using the AI engine that includes multiple first processing layers, an interposing forward-projection module and multiple second processing layers by performing the following:
generate second 3D feature volume data by processing the first 3D feature volume data using the multiple first processing layers that are associated with first weight data and operate in a 3D volume space;
transform the second 3D volume data into 2D feature data using the forward-projection module; and
generate analysis output data by processing the 2D feature data using the multiple second processing layers that are associated with second weight data and operate in a 2D projection space.

16. The computer system of claim 15, wherein the instructions for generating the second 3D feature volume data cause the processor to:
generate second 3D feature volume data by processing the first 3D feature volume data using the multiple first processing layers that are trained to perform decoding on the first 3D feature volume data.

17. The computer system of claim 15, wherein the instructions for generating the analysis output data cause the processor to:
generate the analysis output data by processing the 2D feature data using the multiple second processing layers that are trained to perform at least one of the following: automatic segmentation, object or feature detection, image artifact suppression, image enhancement and de-truncation.

18. The computer system of claim 17, wherein the instructions for processing the 2D projection data using the AI engine cause the processor to:
generate the analysis output data by processing both the 2D feature data and the 2D projection data using the multiple second processing layers.

19. The computer system of claim 15, wherein the instructions further cause the processor to:
obtain training data that includes (a) training 3D feature volume data and (b) training analysis output data; and
train the multiple first processing layers and the multiple second processing layers, with the forward-projection module interposed in between, to transform (a) the training 3D feature volume data and (b) the training analysis output data and to learn the respective first weight data and second weight data.

20. The computer system of claim 15, wherein the instructions for obtaining the first 3D feature volume data cause the processor to:
obtain the first 3D feature volume data for processing by the AI engine, being a second AI engine, from a first AI engine that is trained to perform tomographic image reconstruction to transform the 2D projection data to the first 3D feature volume data.

21. The computer system of claim 15, wherein the instructions further cause the processor to:
obtain training data that includes (a) training 2D projection data and (b) training analysis output data; and
train the first AI engine and the second AI engine together to perform integrated tomographic image reconstruction and analysis to transform (a) the training 2D projection data to (b) the training analysis output data.

* * * * *